US012754426B2

(12) United States Patent
Bronstein et al.

(10) Patent No.: US 12,754,426 B2
(45) Date of Patent: Oct. 6, 2026

(54) LAMINATED GLAZING FOR HEAD-UP DISPLAY

(71) Applicant: ACR II GLASS AMERICA INC., Nashville, TN (US)

(72) Inventors: Wladislaw Bronstein, Konz (DE); Olivier Farreyrol, Wasserbillig (LU); Markus Walter Pohlen, Mückeln (DE); Michael Bard, Wadern (DE)

(73) Assignee: ACR II GLASS AMERICA INC., Nashville, TN (US)

( * ) Notice: Subject to any disclaimer, the term of this patent is extended or adjusted under 35 U.S.C. 154(b) by 319 days.

(21) Appl. No.: 18/571,573

(22) PCT Filed: Jun. 17, 2022

(86) PCT No.: PCT/US2022/034055

§ 371 (c)(1),
(2) Date: Dec. 18, 2023

(87) PCT Pub. No.: WO2022/266481

PCT Pub. Date: Dec. 22, 2022

(65) Prior Publication Data

US 2024/0280819 A1 Aug. 22, 2024

Related U.S. Application Data

(60) Provisional application No. 63/228,878, filed on Aug. 3, 2021, provisional application No. 63/211,872, filed on Jun. 17, 2021.

(51) Int. Cl.

| | |
|---|---|
| ***G02B 27/01*** | (2006.01) |
| ***B32B 17/10*** | (2006.01) |
| ***G02B 5/30*** | (2006.01) |

(52) U.S. Cl.
CPC .... *G02B 27/0172* (2013.01); *B32B 17/10036* (2013.01); *B32B 17/10348* (2013.01);
(Continued)

(58) Field of Classification Search
CPC .............. G02B 27/0172; G02B 5/3066; G02B 2027/0118; B32B 17/10036;
(Continued)

(56) References Cited

U.S. PATENT DOCUMENTS

2019/0299752 A1 10/2019 Sadakane et al.
2019/0337270 A1 11/2019 Sadakane et al.
2023/0028048 A1* 1/2023 Anzai .................. G02B 5/3016

FOREIGN PATENT DOCUMENTS

JP 2013068889 A 4/2013
JP WO2013190959 A1 5/2016
(Continued)

OTHER PUBLICATIONS

European Office Action for European Patent Application No. 22741927.2 dated Mar. 26, 2026 (7 pages).

*Primary Examiner* — William Choi
(74) *Attorney, Agent, or Firm* — K&L Gates LLP

(57) ABSTRACT

A laminated glazing includes a first glass sheet having first and second opposing surfaces, a second glass sheet having third and fourth opposing surfaces, an interlayer between the first glass sheet and the second glass sheet, wherein the interlayer is positioned between the second surface of the first glass sheet and the third surface of the second glass sheet, a p-polarized light reflective layer, and an opaque layer, wherein the p-polarized light reflective layer is positioned between a vehicle interior and the opaque layer when the laminated glazing is installed in a vehicle.

13 Claims, 2 Drawing Sheets

(52) U.S. Cl.
CPC .. *B32B 17/10458* (2013.01); *B32B 17/10761* (2013.01); *B32B 17/10788* (2013.01); *G02B 5/3066* (2013.01); *B32B 2457/20* (2013.01); *B32B 2605/00* (2013.01); *G02B 2027/0118* (2013.01)

(58) Field of Classification Search
CPC ........ B32B 17/10348; B32B 17/10458; B32B 17/10761; B32B 17/10788; B32B 2457/20; B32B 2605/00
USPC ............................................... 359/630; 345/7
See application file for complete search history.

(56) References Cited

FOREIGN PATENT DOCUMENTS

| | | | |
|---|---|---|---|
| JP | 2017187685 | A | 10/2017 |
| WO | 2022/179817 | A1 | 9/2022 |

* cited by examiner

LAMINATED GLAZING FOR HEAD-UP DISPLAY

CROSS REFERENCE TO RELATED APPLICATIONS

This application is a national phase entry of PCT/US2022/034055, filed Jun. 17, 2022, which claims priorities to U.S. Provisional Application No. 63/211,872, filed on Jun. 17, 2021, entitled "LAMINATED GLAZING" and U.S. Provisional Application No. 63/228,878, filed on Aug. 3, 2021, entitled "LAMINATED GLAZING," the entire contents of which are incorporated by reference herein in their entirety.

TECHNICAL FIELD

The present disclosure is generally related to a laminated glazing having a portion for display of information for a driver.

BACKGROUND

Head-up displays are used in automotive vehicles for providing an image or information to a driver without requiring the driver to look away from the windshield. Information may be projected onto the windshield in an area that can be seen without obstructing the view of the driver. Some information may require an improvement over existing constructions to improve the visibility of certain projected information.

SUMMARY OF THE DISCLOSURE

Disclosed herein is a laminated glazing, comprising a first glass sheet having first and second opposing surfaces, a second glass sheet having third and fourth opposing surfaces, an interlayer between the first glass sheet and the second glass sheet, wherein the interlayer is positioned between the second surface of the first glass sheet and the third surface of the second glass sheet, a p-polarized light reflective layer, and an opaque layer, wherein the p-polarized light reflective layer is positioned between a vehicle interior and the opaque layer when the laminated glazing is installed in a vehicle. The laminated glazing may include the p-polarized light reflective layer in an area overlapping with the opaque layer to provide a display surface, such that the opaque layer is a background for the display surface.

As disclosed herein, the p-polarized light reflective layer may be a reflective film having a base film and one or more reflective layers on the base film. Alternatively, the p-polarized light reflective layer may be a coating or a reflective layer adhered to one of the second glass sheet and the interlayer. The p-polarized light reflective layer may not extend beyond the opaque layer. The p-polarized light reflective layer may completely overlap with the opaque layer such that the opaque layer extends past edges of the p-polarized light reflective layer.

The opaque layer may be on the reflective film or on the first glass sheet and may be a black print or may include an enamel material. The laminated glazing may have a masking layer covering at least one of the edges of the p-polarized light reflective layer. The masking layer may be an enamel print.

In another aspect of the present disclosure, a head-up display system may comprise a laminated glazing as described above and a projector for projecting p-polarized light toward the p-polarized light reflective layer of the laminated glazing, wherein an image is produced as a virtual image from a reflection of the p-polarized light at the p-polarized light reflective layer.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

In the following description, for purposes of explanation, specific details are set forth in order to promote a thorough understanding of one or more aspects of the disclosure. It may be evident in some or all instances, however, that any aspects described below can be practiced without adopting the specific design details described below.

A conventional laminated glazing may include a first glass sheet, an interlayer, and a second glass sheet laminated together. The glass sheets may be bent to a desired shape prior to lamination with an interlayer therebetween. Preferably, the glass sheets may be a soda-lime silica glass. Glass bending may preferably occur by heat treatment from 550° C. to 700° C., more preferably from 580° C. to 660° C. The interlayer may include an adhesive polymer sheet, which may include polyvinyl butyral (PVB) or ethylene vinyl acetate (EVA). An interlayer may include an ionomer sheet in some glazings. Such a laminated glazing may include a windshield. The mounted angle of the windshield to the vehicle body may be 50 to 70 degrees, preferably 55 to 65 degrees.

A windshield herein may include an area for projecting an image which may provide information to an observer, such as a driver or other vehicle occupant. Such information may include that which is typically provided in a vehicle dash, such as an odometer and speedometer. This type of information may be needed no matter external conditions which may otherwise affect a head-up display. Lights from oncoming traffic, low standing sun, or their reflections on the street or on the engine hood may hinder visibility of a head-up display. FIGS. 1 to 4 illustrate cross-sections of example laminated glazings according to the present disclosure which may be used as part of a head-up display system.

Figure 1:
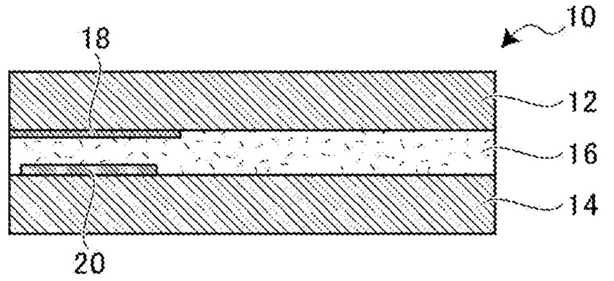
FIG. 1 illustrates a laminated glazing, according to an embodiment of the present disclosure.
Figure 2:
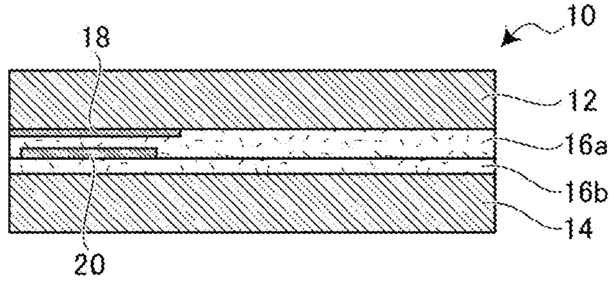
FIG. 2 illustrates a laminated glazing, according to an embodiment of the present disclosure.
Figure 3:
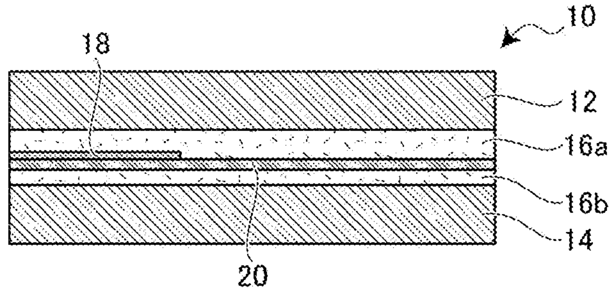
FIG. 3 illustrates a laminated glazing, according to an embodiment of the present disclosure.

The reflection of a projected display, particularly in a lower area of a windshield, may be improved by the use of a reflective layer as described herein. A p-polarized light reflective layer may be suitable to provide a quality reflected image for an observer. With reflection angles near the Brewster-angle, the reflection of p-polarized light from the glass surface is low which provides a head-up display image of weak intensity when used with p-polarized sunglasses. A reflective layer may increase the p-polarized reflection and increase head-up display visibility. P-polarized light reflective layers may include a film having a base film and a reflective layer thereon or may include a reflective layer without a base film. The p-polarized light reflective layer without a base film may be adhered to a surface within the glazing or coated on such a surface, as shown in FIG. 1. Where the reflective film includes a base film, the film may be laminated between first and second glass sheets between first and second interlayers, as shown in FIGS. 2, 3.

The p-polarized light reflective layer may have a reflectivity of a projected p-polarized light from 4% to 50%, preferably 10% to 35%, more preferably 20% to 30% at the Brewster's angle for the interface of the second glass sheet 14 and the air. The reflective layer in this disclosure may have a smooth surface with a roughness Ra of less than 500 nm, preferably less than 200 nm, more preferably less than 100 nm. The reflective layer may have a low reflection haze value less than 10%, preferably less than 5%, more preferably less than 3%. The roughness Ra may be determined according to ISO 4287: 1997, "Geometrical Product Specifications (GPS)—Surface texture: Profile method—Terms, definitions and surface texture parameters". Reflection haze may be determined according to ISO 13803:2014, "Paint and varnishes—Determination of haze on paint films at 20°".

The reflective layer may preferably have low waviness such that waviness of the reflected HUD image is below 0.8 mrad, more preferably <0.5 mrad, and even more preferably <0.3 mrad. The waviness may be determined in a reflected image setup as defined in ISO 16610:2011 where horizontal and vertically projected lines should be evaluated to angular deviations.

Contrast of the reflected image off the reflective layer may be determined as defined in PCT/US2021/051968. At 30 line pairs, the contrast may preferably be at least 30%, more preferably at least 50% and even more preferably at least 70%.

A typical windshield may include a laminated glazing having a first glass sheet and a second glass sheet. The first glass sheet may include a first surface and a second surface wherein the first surface faces a vehicle exterior when installed in a vehicle. The second glass sheet may include a third surface and a fourth surface wherein the fourth surface faces a vehicle interior when installed in a vehicle. An interlayer between the first and second glass sheets may be positioned between the second surface of the first glass sheet and the third surface of the second glass sheet. The p-polarized light reflective layer may preferably be positioned between the second surface of the first glass sheet and the third surface of the second glass sheet. A reflective layer without a base film may be adhered or coated preferably to the third glass surface of the second glass sheet or to a surface of an interlayer in the glazing. The reflective layer may preferably be provided at least in a lower portion of the windshield, below a main viewing area.

To increase visibility of the reflections, it may be desirable to provide an opaque or darkened layer behind the reflective layer, when viewed from a vehicle interior. As such, an opaque layer may be provided on the windshield to the outside of the reflective layer. The opaque layer may be black and may provide a dark background for the reflection and increase visibility of the head-up display by providing a higher image contrast and blocking external light. The opaque layer may block light from the vehicle exterior such that light and weather conditions may not affect the image projected to the reflective layer area of the windshield glazing. The opaque layer may further eliminate another reflection from the first surface of the first glass sheet.

The glazing may further include an opaque layer at an outer periphery of the glazing. The opaque layer aligned with the reflective layer may be a part of or separate from an outer periphery opaque layer of the glazing. The opaque layer may include material known in the art, such as an enamel paint which may be screen printed onto the glass sheet. The opaque layer may include an extended or wide portion for aligning with the reflective paint to provide a head-up display surface. Where the reflective layer includes a base film, the opaque layer may be printed onto the base film. In such an embodiment, the painted surface may be positioned within the glazing to the outside of the reflective layer, such that the reflective layer faces a vehicle interior when installed. The opaque layer on a base film may be printed by suitable printing methods, such as screen printing, digital printing, or roll-to-roll printing. The opaque layer may extend up from a bottom of the glazing but may extend upwards through less than half of the laminated glazing. Preferably, the opaque layer may extend upwards through less than a third of the laminated glazing. In some embodiments, the opaque layer may extend across the entire glazing width.

In some embodiments, the opaque layer may have a total light transmission of 50% or less, 40% or less, or 10% or less. The opaque layer may preferably have a total light transmittance of 0% to 5%, more preferably 0% to 1%, even more preferably 0 to 0.2%. The total light transmittance may be determined according to ISO 9050:2003, "Glass in building—Determination of light transmittance, solar direct transmittance, total solar energy transmittance, ultraviolet transmittance and related glazing factors". To measure light transmission across a wavelength spectrum or at a particular wavelength, including the visible light wavelength range, any suitable equipment complying with the ISO 9050:2003 may be used, such as a UV-Vis Spectrophotometer (e.g., U4000, Hitachi High-Tech Science).

The opaque layer may be formed of colored resin film, or colored coating. The colored resin film may be a resin film containing pigments, dye, or any other coloring materials and may be inserted between the first and second glass sheets, preferably between the first glass sheet and an interlayer. The colored coating may be an organic or inorganic coating containing pigments, dye, or any other coloring materials on the first glass sheet, the second glass sheet, the interlayer, the reflective layer, or other components in the laminated glazing. A part of the interlayer may be colored as the opaque layer. The colored part of the interlayer may contain pigments, dye, or any other coloring materials, or the colored part of the interlayer may be coated with a paint containing pigments, dye, or any other coloring materials.

FIG. 1 illustrates a structure of a laminated glazing 10 according to the present disclosure. The laminated glazing 10 to be used for a windshield of an automobile may include a first glass sheet 12 and a second glass sheet 14. An interlayer 16 may be formed of a resin layer such as PVB or EVA and be provided between the first and second glass sheets 12, 14. An opaque layer 18 may be formed on the second surface of the first glass sheet 12 and may be arranged between an interior surface of the first glass sheet 12 and the exterior surface of the interlayer 16. The opaque layer 18 may be provided on a lower end of the windshield as extending along the lower edge of the first glass sheet 12. The opaque layer 18 may be black and provide a dark background for providing a good contrast to the images produced at the p-polarized light reflective layer 20. The opaque layer 18 may be made of a black print, and more particularly, include an enamel material.

A p-polarized light reflective layer 20 may be provided between the second surface of the first glass sheet 12 and the third surface of the second glass sheet 14. The p-polarized light reflective layer 20 may be made of any suitable material having a property reflecting p-polarized light sufficiently. The p-polarized light reflective layer 20 on the second glass sheet 14 may be in an area overlapping with the opaque layer 18. The term "overlapping" is defined from observer's eye point. The p-polarized light reflective layer 20 may be adhered to the surface within the glazing. Alternatively, the p-polarized light reflective layer 20 may be coated on such a surface of the glass sheet.

Figure 5:
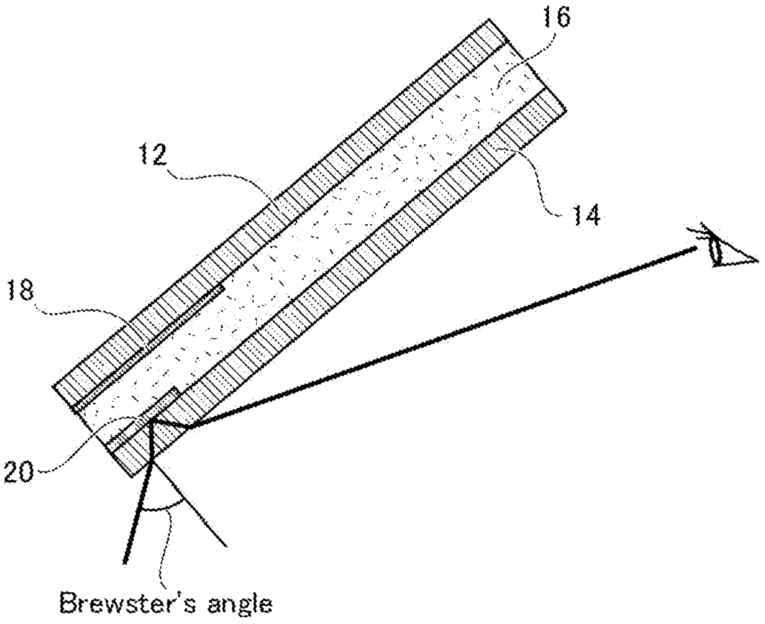
FIG. 5 illustrates a cross-section of a portion of a laminated glazing, according to an embodiment of the present disclosure.

With this structure shown in FIG. 1, light paths can be illustrated as shown in FIG. 5. A projector, not shown, may generate and emit p-polarized light that may constitute images including information such as, e.g., vehicle speed or direction signal. The p-polarized light may enter the surface of the second glass sheet 14 with the Brewster's angle, and therefore, the p-polarized light may not be reflected toward the observer's eye from the surface of the second glass sheet 14. The p-polarized light may further reach the surface of the p-polarized light reflective layer 20 and may be reflected off the surface of the p-polarized light reflective layer 20. The reflected p-polarized light then may extend toward the observer's eye. An image may be produced as a virtual image from a reflection of the p-polarized light at the p-polarized light reflective layer 20. Because the observer may only see the p-polarized light reflecting at the p-polarized light reflective layer 20, the observer may not see any ghost image otherwise created from the light reflected at the surface of the second glass sheet 14. The p-polarized light reflective layer 20 is located at a position where the opaque layer 18 serves as a background for blocking unnecessary light from an exterior so that the observer can see higher contrast images reflecting from the p-polarized light reflective layer 20.

FIG. 2 illustrates another structure of the windshield according to the present disclosure. In FIG. 2, the laminated glazing to be used for a windshield of an automobile may include a first glass sheet 12 and a second glass sheet 14. First and second interlayers 16*a*, 16*b* may be provided between the first and second glass sheets 12, 14. The opaque layer 18 may be formed on the second surface of the first glass sheet 12 in substantially the same way as shown in FIG. 1. A p-polarized light reflective layer 20 may be provided between the first interlayer 16*a* and the second interlayer 16*b*. The first and second interlayers 16*a*, 16*b* may be made of the same or different materials. One of the first interlayer 16*a* and the second interlayer 16*b* may be a thin adhesive coating which has a thickness of 1 to 50 micrometers, preferably 1 to 25 micrometers, more preferably 4 to 15 micrometers. With this structure shown in FIG. 2, the p-polarized light reflective layer 20 may be located at a position such that the opaque layer 18 is used for the background for blocking optical noise, such as an exterior light.

In some embodiments, a reflective layer 20 may extend across a majority of the glazing 10, however, the opaque layer 18 may be included in only a portion of the glazing 10. Where the reflective layer 20 extending across a majority of the glazing 10 includes a base film and opaque layer 18, the opaque layer 18 may be provided on only a portion of the base film. Particularly, the opaque layer 18 may be provided in a lower portion of the base film to provide a dark background for images projected to a lower windshield area. In FIG. 3, the opaque layer 18 and the p-polarized light reflective layer 20 may be sandwiched between the first interlayer 16*a* and the second interlayer 16*b*. The opaque layer 18 may be arranged on a lower portion of the windshield. The p-polarized light reflective layer 20 may be formed as extended across a majority of the glazing 10. The opaque layer 18 may be formed directly on the p-polarized light reflective layer 20. The p-polarized light reflective layer 20 is located at a position such that the opaque layer 18 is used for the background for blocking optical noise, such as exterior light.

In some embodiments, the reflective layer 20 may be provided in only a portion aligning with the opaque layer 18. Limiting the area of the reflective layer 20 may decrease costs and alleviate difficulties that may arise when laminating a film or placing the reflective layer 20. A reflective layer material may be provided in a size and position such that it does not extend past the opaque layer 18. In some embodiments the opaque layer 18 may extend past the edges of the reflective layer 20. Where the reflective layer 20 is provided with a base film, laminating a film within the glazing 10 may cause a distortion in the laminated glazing 10 around an edge of the laminated film. Where the opaque layer 18 extends beyond the border of such a film, the distortion may be masked by the opaque layer 18 such that it does not interfere with or distract an observer's sight. In some embodiments, an additional reflective layer may be provided in another part of the glazing 10. The reflective mechanism may be the same or different from the p-polarized light reflective layer 20.

Figure 4:
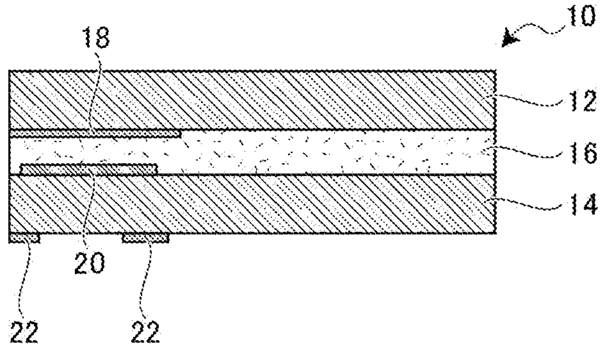
FIG. 4 illustrates a laminated glazing, according to an embodiment of the present disclosure.

Some further embodiments may include a masking layer 22 on a glazing surface facing an interior when installed in a vehicle, as shown in FIG. 4. FIG. 4 illustrates a laminated glazing 10 with a masking layer 22 according to the present disclosure. The masking layer 22 may be opaque and may include an enamel print. The masking layer 22 may be the same color as the first opaque or darkened layer 18. In some embodiments, the masking layer 22 may be the same material as the first opaque or darkened layer 18. Further embodiments may include a masking layer sticker or film applied to a glass surface. The masking layer 22 may be applied before or after lamination of a glazing 10. The masking layer 22 may cover any edges of the p-polarized light reflective layer 20. The masking layer 22 may include an opening through which the p-polarized light reflective layer 20 may receive light from a projector so that the reflection may be visible to an observer. The masking layer 22 may extend across the entire glazing in a lower portion which includes the p-polarized light reflective layer 20. Where the p-polarized light reflective layer 20 is applied to a vehicle interior-facing glass surface, the masking layer 22 may be formed over the reflective layer 20 such that the reflective layer 20 is between the glass surface and the masking layer 22.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention claimed is:

1. A laminated glazing, comprising:
   - a first glass sheet having first and second opposing surfaces;
   - a second glass sheet having third and fourth opposing surfaces;
   - an interlayer between the first glass sheet and the second glass sheet, wherein the interlayer is positioned between the second surface of the first glass sheet and the third surface of the second glass sheet;
   - a p-polarized light reflective layer between the first glass sheet and the second glass sheet; and
   - an opaque layer,
   - wherein the p-polarized light reflective layer is positioned between a vehicle interior and the opaque layer when the laminated glazing is installed in a vehicle,
   - wherein the p-polarized light reflective layer is in an area overlapping with the opaque layer to provide a display surface, such that the opaque layer is a background for the display surface,
   - wherein the opaque layer is on the p-polarized light reflective layer and wherein the opaque layer is on the first glass sheet.

2. The laminated glazing according to claim 1, wherein the p-polarized light reflective layer is a reflective film having a base film and one or more reflective layers on the base film.

3. The laminated glazing according to claim 1, wherein the p-polarized light reflective layer is on the third surface of the second glass sheet.

4. The laminated glazing according to claim 1, wherein the interlayer includes a first interlayer and a second interlayer and the p-polarized light reflective layer is positioned between the first interlayer and the second interlayer.

5. The laminated glazing according to claim 1, wherein the opaque layer is a black print.

6. The laminated glazing according to claim 5, wherein the opaque layer includes an enamel material.

7. The laminated glazing according to claim 1, wherein the p-polarized light reflective layer includes a coating.

8. The laminated glazing according to claim 1, wherein the p-polarized light reflective layer is a reflective layer adhered to one of the second glass sheet and the interlayer.

9. The laminated glazing according to claim 1, wherein the p-polarized light reflective layer does not extend beyond the opaque layer.

10. The laminated glazing according to claim 1, wherein the p-polarized light reflective layer is completely overlapping with the opaque layer such that the opaque layer extends past edges of the p-polarized light reflective layer.

11. The laminated glazing according to claim 1, further comprising a masking layer, wherein the masking layer covers at least one of the edges of the p-polarized light reflective layer.

12. The laminated glazing according to claim 11, wherein the masking layer is an enamel print.

13. A head-up display system, comprising: a laminated glazing, comprising:
   - a first glass sheet having first and second opposing surfaces,
   - a second glass sheet having third and fourth opposing surfaces,
   - an interlayer between the first glass sheet and the second glass sheet, wherein the interlayer is positioned between the second surface of the first glass sheet and the third surface of the second glass sheet,
   - a p-polarized light reflective layer between the first glass sheet and the second glass sheet, and
   - an opaque layer,
   - wherein the p-polarized light reflective layer is positioned between a vehicle interior and the opaque layer when the laminated glazing is installed in a vehicle, and
   - wherein the p-polarized light reflective layer is in an area overlapping with the opaque layer to provide a display surface, such that the opaque layer is a background for the display surface;
   - wherein the opaque layer is on the p-polarized light reflective layer; wherein the opaque layer is on the first glass sheet; and
   - a projector for projecting p-polarized light toward the p-polarized light reflective layer of the laminated glazing, wherein an image is produced as a virtual image from a reflection of the p-polarized light at the p-polarized light reflective layer.

* * * * *